April 27, 1937.    B. SPERO    2,078,590
TELESCOPIC SPECTACLES
Filed April 10, 1935

BERNARD SPERO
INVENTOR

BY *J. A. Ellestad*
ATTORNEY

Patented Apr. 27, 1937

2,078,590

UNITED STATES PATENT OFFICE 2,078,590

TELESCOPIC SPECTACLES

Bernard Spero, Chicago, Ill.

Application April 10, 1935, Serial No. 15,604

7 Claims. (Cl. 88—41)

The present invention relates to telescopic spectacles and more particularly to an improved means for mounting telescopic lens systems in a spectacle frame.

Telescopic spectacles, as constructed at present, are heavy and unsightly in appearance. The telescopic lens assemblies are mounted in metal tubes and these tubes are fixed in special frames. In order to make them capable of supporting the lens tubes, the frames are made very heavy and special nose pads are used. This serves to increase both the weight and the unsightliness of the spectacles.

One of the objects of the present invention is to provide a new and improved telescopic spectacle lens assembly which is light in weight and neat in appearance. Another object is to provide a telescopic spectacle lens assembly capable of being mounted in an ordinary spectacle frame. A further object is to provide a telescopic spectacle lens assembly in which the lenses are held by transparent carrier members. These and other objects and advantages reside in certain novel features of construction, arrangement and combination of parts as will hereinafter be more fully set forth and pointed out in the appended claims.

Referring to the drawing.

Figure 1:
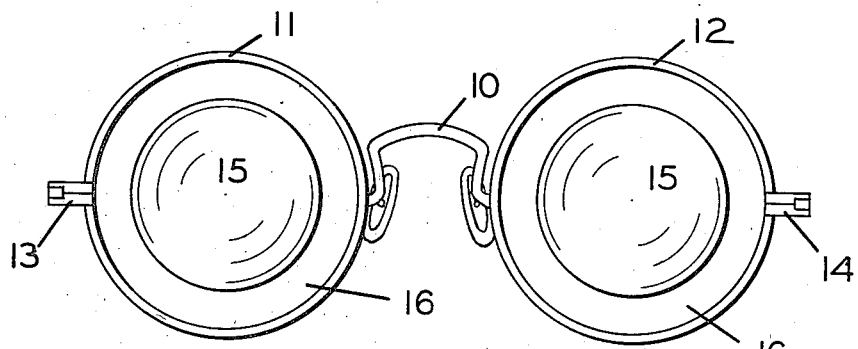
Fig. 1 is a front elevation of a pair of spectacles embodying my invention.
Figure 2:
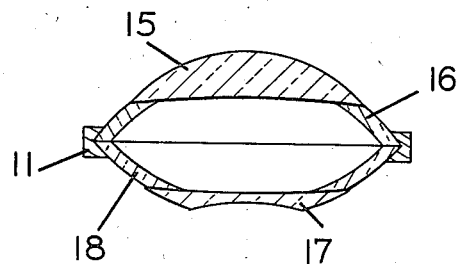
Fig. 2 is a sectional view of the lens assembly.

One embodiment of my invention is illustrated in the drawing wherein 10 indicates the bridge of a pair of spectacles having eye wires 11 and 12 and temple connections 13 and 14. Each telescopic lens assembly has a positive lens 15 secured to a glass carrier member 16 and a negative lens 17 secured to a second glass carrier member 18. The two glass carrier members 16 and 18, as shown in Fig. 2, meet with a relatively narrow ledge so that both may be held by a single eye wire 11.

As shown, the lenses 15 and 17 are separate from the carrier members 16 and 18 and are suitably secured thereto as by cementing or fusing, for example. However, either lens and its respective carrier member can be ground from a single piece of glass or the carrier member can be formed as a concavo convex disk rather than as an annular ring as shown. Also while my invention is shown as applied to a telescopic spectacle it is not so limited. My invention can be applied with the same beneficial results to any ophthalmic lens system where two lenses are to be held in spaced axial relation.

From the foregoing it will be apparent that I am able to attain the objects of my invention and provide a new and improved mounting means for telescopic lens systems for spectacles which is neat in appearance and can be mounted in an ordinary spectacle frame. The spectacle lens assemblies made according to the present invention are only slightly more noticeable than the ordinary spectacle lens. Various modifications can, of course, be made without departing from the spirit of my invention or the scope of the appended claims.

I claim:

1. In a spectacle an eyewire, two transparent carrier members secured in said eye wire and two lenses, one secured to each of said carrier members, said carrier members holding said lenses in spaced relation.

2. An ophthalmic lens assembly comprising a positive lens, a transparent member extending from the edge of said lens, a negative lens and a transparent member extending from the edge of said negative lens, said transparent members being adapted to be held by a single eye wire.

3. In a device of the character described, two rigid annular concavo convex transparent members, a single eye wire for holding said members at their outer edges, and two lenses, one secured to each member.

4. In a device of the character described, two concavo convex transparent members, a single eye wire for holding said members at their edges, a positive lens secured to one of said members and a negative lens secured to the other of said lenses.

5. In a telescopic spectacle a positive front lens, a transparent member extending outwardly and rearwardly from said front lens, a negative rear lens, a second transparent member extending outwardly and forwardly from said negative lens, and a single eye wire holding the adjacent surfaces of said members in abutting relation.

6. An ophthalmic lens assembly comprising a first concavo-convex glass support having flat parallel front and rear edges, a positive lens concentrically secured on the flat front edge, a second concavo-convex glass support having flat parallel front and rear edges, a negative lens concentrically secured on the flat rear edge, the rear flat edge of said first support and the front flat edge of the second support being in abutting relation, and a single eye wire holding said edges in such relation.

7. An ophthalmic lens assembly comprising two concavo-convex glass supports each having a flat edge on its concave side, an eye wire securing said supports together with their flat edges in abutting relation, said supports also each having a flat edge on its convex side and means for mounting two lenses in axial alignment, one on each of said last-named flat edges.

BERNARD SPERO.